United States Statutory Invention Registration [19]

[11] Reg. Number: H738

McManus et al. [43] Published: Feb. 6, 1990

[54] SWITCHED HOLOGRAMS FOR RECONFIGURABLE OPTICAL INTERCONNECT

[75] Inventors: J. Barry McManus, Arlington; Roger S. Putnam, Newton, both of Mass.; H. John Caulfield, Cornersville, Tenn.

[73] Assignee: The United States of America as represented by the Secretary of the Army, Washington, D.C.

[21] Appl. No.: 381,543

[22] Filed: Jul. 17, 1989

[51] Int. Cl.[4] ..... G02B 5/32; G02F 1/13

[52] U.S. Cl. ..... 350/3.7; 350/3.6; 350/330; 350/354

*Primary Examiner*—Thomas H. Tarcza
*Assistant Examiner*—Linda J. Wallace
*Attorney, Agent, or Firm*—Freddie M. Bush; James T. Deaton

[57] ABSTRACT

A device that provides reconfigurable optical interconnections of multiple data channels that have applications in highly parallel computers. The device utilizes an array of optical switches which direct a set of optical beams toward any one of a selection of holograms and each hologram when selected deflects the input beams toward a detector.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

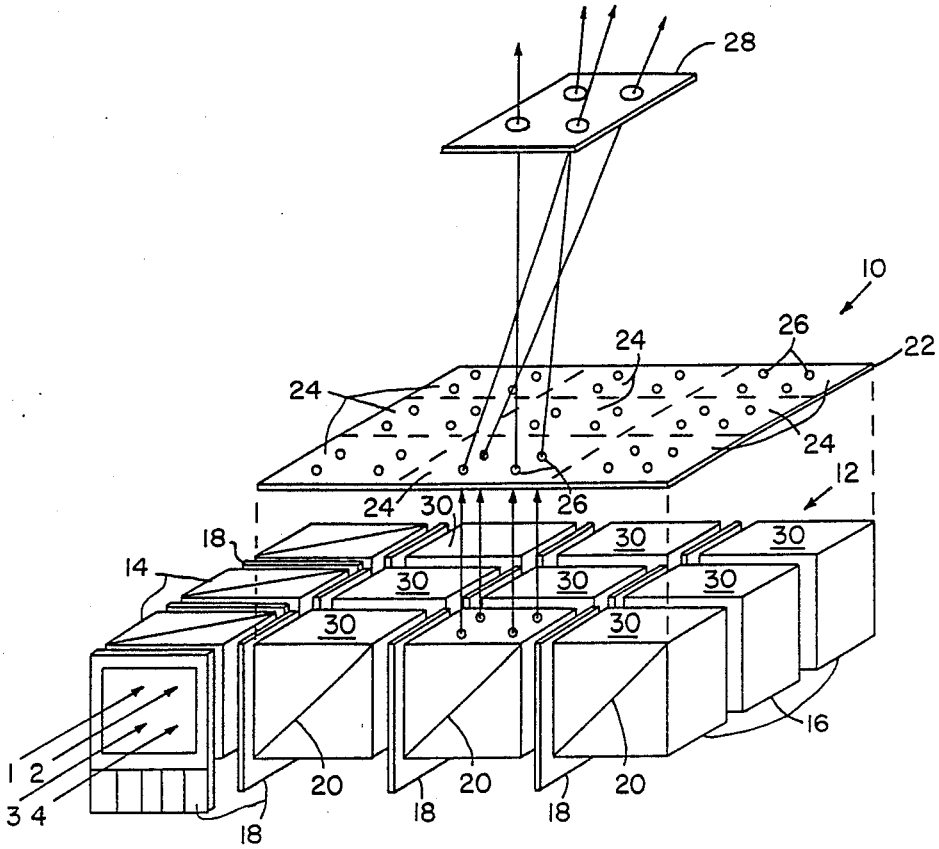
28
10
26
24
22
24
24
24
12
24
30
26
18
30
30
14
30
30
30
30
30
16
1
2
3
4
20
20
20
18
18
18

SWITCHED HOLOGRAMS FOR RECONFIGURABLE OPTICAL INTERCONNECT

DEDICATORY CLAUSE

The invention described herein was made in the course of or under a contract or subcontract thereunder with the Government and may be manufactured, used, and licensed by or for the Government for governmental purposes without the payment to us of any royalties thereon.

BACKGROUND OF THE INVENTION

In the optical computer field, there is a need for a switching device that has application in highly parallel optical computers.

Accordingly, it is an object of this invention to provide a switching device for switching optical inputs to the desired detector means.

Other objects and advantages of this invention will be obvious to those skilled in this art.

SUMMARY OF THE INVENTION

In accordance with this invention, a Holoswitch is provided that includes an array of optical switches that are arranged in a pattern of three rows of four switches each. Each switch is a combination of a twisted-nematic liquid crystal cell and a polarizing beamsplitter. A holographic plate is arranged above output faces of nine of the optical switches with nine sub-holograms for receiving optical signals from the output faces. Within each sub-hologram, there is a number of holographic spots with one spot for each channel with each holographic spot being designed to deflect its beam or signal toward an output detector means or array. By switching the twisted-nematic liquid crystal cells as desired, multiple inputs to the switch array can be directed as desired to the detector means.

DESCRIPTION OF THE DRAWINGS

The single FIGURE of the drawing is a pictorial representation of the Holoswitch in accordance with this invention.

DESCRIPTION OF THE PREFERRED EMBODIMENT

Referring to the drawing, a Holoswitch 10 includes a switch array 12 of twelve optical switches that are arranged in a pattern of three rows of four switches each. End switches 14 are mounted to deflect input beams 90 degrees to the other nine switches 16. Each switch 14 or 16 is a combination of a twisted-nematic liquid crystal cell 18 and a polarizing beamsplitter 20. A single hologram plate 22 rests above output faces 30 of each of the nine switches 16 of the switch array, with nine sub-holograms 24 of interconnection patterns. Within each sub-hologram 24, there is a number of holographics spots 26 with one spot for each channel. Each spot 26 individually deflects its beam toward an array of detector means or collection opticals 28 with any desired, prerecorded permutation. Input to the optical switches includes four optical input channels 1, 2, 3 and 4 that are in the form of an array of parallel laser beams. Additional input optical channels can be utilized if desired.

In operation, when optical inputs 1, 2, 3, and 4 are presented to the input as illustrated and with optical switches 18 being set to direct input signals 1, 2, 3, and 4 to the desired selected sub-hologram 24, by having the appropriate potential applied to the appropriate optical switches 18 to cause the input to be directed to the desired sub-hologram 24, these optical inputs are then directed by the holographic spots 26 on sub-hologram 24 to detector means or array 28. By applying the appropriate signals to optical switches 18, inputs 1,2, 3, and 4 can be caused to exit any one of the desired output faces 30 of polarizing beamsplitters 20 to its corresponding sub-hologram 24.

It will be appreciated that applicants have provided reconfigurable optical interconnections of multiple data channels that have applications in highly parallel computers. Applicants' device utilizes an array of optical switches that directs a set of optical beams toward any one of a selection of sub-holograms 24. Each sub-hologram 24, when selected, deflects the input beams toward an array of detector means or collection optics with any desired prerecorded premutation. Out of the enormous number of permutations that are possible with many (approximately 1000) input channels, only a tiny subset represents useful interconnection patterns in a computer. Thus, a modest number of holograms is sufficient for many parallel computing algorithms. Applicants' device provides nine different interconnection patterns on a single four by five inch holographic plate. Permutation holograms with 4, 16, 64 channels per pattern have been recorded. Input beams 1, 2, 3, and 4 enter switch arrays 18 and are directed together toward one of nine output areas 30 as determined by the switch settings of optical switches 18. The particular optical switch arrays 18 for the prototype of this invention consisted of 12 optical switches arranged in a pattern of 3 rows, of 4 switches each. Each switch was a combination of a twisted-nematic liquid crystal cell 18 and a polarizing beamsplitter. A single holographic plate 22 above the output faces 30 of the switch array with 9 subholograms 24 of interconnection patterns was utilized. Within each sub-hologram 24, there are a number of holographic spots 26, with one spot for each channel, that individually deflect its beam toward output array 28. The use of spatially multiplexed holograms for optical interconnect has been demonstrated previously and a variety of other holographic optical interconnection methods have previous been described. The new characteristic of applicants' Holoswitch device is the use of a switch array to address different holograms to change the interconnection pattern.

There are simple modifications of the Holoswitch device that can make it more useful. These include, making the device in a more compact, monolithic form, and using pixelated liquid crystal cells to allow many more connection patterns. If one makes the switch array as a monolithic, glued arrangement of prisms and liquid crystal cells, the Holoswitch linear size can be reduced half that of the prototype produced by applicants. Such a structure has been produced but without the hologram or support structures. This switch array, with the same number of prisms and cells as the original prototype, functions nearly as well as the original prototype. The holoswitch provides many more interconnection patterns if pixelated liquid crystal cells are used so that the beams can be directed independently to the sets of holograms. These liquid crystal cells are similar to twisted nematic television screens where there is one pixel per optical channel or beam. With N beam and M holograms (with N spots each), there are only M possible interconnection patterns available with the prototype Holoswitch design. With the capability to individually control the path of each beam, one has $M^N$ possible permutations. The number of patterns can be increased further if one allows for fan-out of the input beams, either by using multiple-exposure holographic spots, or by using the gray-scale of the individual pixels. With the pixels only partially switched, one beam can be split and sent toward several holograms simultaneously. The increased capacity can be exploited by constructing the desired interconnection patterns by combining simpler generic patterns that are recorded in the sub-holograms. Other uses and modifications of the device will be obvious to those skilled in this art.

We claim:

1. A Holoswitch comprising a switch array of a multiplicity of optical switches, said optical switches each including a liquid crystal cell and a polarizing beam-splitter, said switch array of said multiplicity of switches having said multiplicity of switches arranged for receiving a plurality of parallel optical beams and for directing the beams as a set toward a selected row of several rows formed by switches of said switch array, each switch of said several rows of said switch array having an output face through which said optical parallel beams can be projected to holographic spots of a hologram plate located adjacent said output face, and said optical face further projecting said beams from the holographic spots to detector means.

2. A Holoswitch as set forth in claim 1, wherein said switch array has 3 input switches aligned in series and 9 output switches that are arranged in 3 rows of 3 switches each with the input, switches having an output face that is 90 degrees with respect to inputs of said input switches.

3. A Holoswitch as set forth in claim 1, wherein said plurality of parallel optical beams is four parallel optical beams.

* * * * *